(12) United States Patent
Hsieh et al.

(10) Patent No.: US 8,587,531 B2
(45) Date of Patent: Nov. 19, 2013

(54) TOUCH INPUT DEVICE

(75) Inventors: Ming-Ta Hsieh, Taipei County (TW); Chien-Ming Lin, Kaohsiung County (TW); Chia-Lin Liu, Taichung County (TW); Chih-Chung Chen, Taichung County (TW); Hsueh-Fang Yin, Kaohsiung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 676 days.

(21) Appl. No.: 12/481,928

(22) Filed: Jun. 10, 2009

(65) Prior Publication Data

US 2010/0315347 A1    Dec. 16, 2010

(51) Int. Cl.
G06F 3/041    (2006.01)

(52) U.S. Cl.
USPC ............. 345/173; 345/156; 345/174; 345/76; 178/18.01; 178/18.02; 178/18.03

(58) Field of Classification Search
USPC ................................. 345/156, 173, 174, 76; 178/18.01–18.03
See application file for complete search history.

(56) References Cited

U.S. PATENT DOCUMENTS

| | | | | |
|---|---|---|---|---|
| 5,543,590 | A * | 8/1996 | Gillespie et al. | 178/18.06 |
| 6,188,391 | B1 * | 2/2001 | Seely et al. | 345/173 |
| 7,379,139 | B2 * | 5/2008 | Yamazaki | 349/116 |
| 8,004,500 | B2 * | 8/2011 | Elias | 345/174 |
| 8,068,097 | B2 * | 11/2011 | GuangHai | 345/173 |
| 8,274,486 | B2 * | 9/2012 | Barbier et al. | 345/173 |
| 2003/0179324 | A1 * | 9/2003 | Yamazaki | 349/43 |
| 2007/0085838 | A1 * | 4/2007 | Ricks et al. | 345/173 |
| 2007/0296709 | A1 * | 12/2007 | GuangHai | 345/173 |
| 2008/0062148 | A1 * | 3/2008 | Hotelling et al. | 345/174 |
| 2008/0231605 | A1 * | 9/2008 | Yang | 345/173 |
| 2009/0002586 | A1 * | 1/2009 | Kimura | 349/39 |
| 2009/0160824 | A1 * | 6/2009 | Chih-Yung et al. | 345/175 |
| 2009/0255737 | A1 * | 10/2009 | Chang et al. | 178/18.06 |
| 2010/0007616 | A1 * | 1/2010 | Jang | 345/173 |
| 2010/0045625 | A1 * | 2/2010 | Yang et al. | 345/173 |
| 2010/0051355 | A1 * | 3/2010 | Yang | 178/18.06 |
| 2010/0073319 | A1 * | 3/2010 | Lyon et al. | 345/174 |
| 2010/0085326 | A1 * | 4/2010 | Anno | 345/174 |
| 2010/0110037 | A1 * | 5/2010 | Huang et al. | 345/174 |
| 2010/0149126 | A1 * | 6/2010 | Futter | 345/174 |
| 2010/0156810 | A1 * | 6/2010 | Barbier et al. | 345/173 |

FOREIGN PATENT DOCUMENTS

| | | |
|---|---|---|
| CN | 1818842 | 8/2006 |
| EP | 0932117 | 7/1999 |

* cited by examiner

*Primary Examiner* — Bipin Shalwala
*Assistant Examiner* — Afroza Chowdhury
(74) *Attorney, Agent, or Firm* — WPAT, PC; Justin King

(57) ABSTRACT

A touch input device includes a substrate, plural sensible conductive layers and plural first switch units. The substrate is provided with an upper surface, the sensible conductive layers are all configured on the upper surface and are arranged in columns and rows. The first switch units are configured on the substrate and are electrically connected with the sensible conductive layers. By the first switch units, same columns of the sensible conductive layers can conduct electrically with one another and same rows of the sensible conductive layers can conduct electrically with one another.

17 Claims, 7 Drawing Sheets

TOUCH INPUT DEVICE

BACKGROUND OF THE INVENTION

1. Field of the Invention

The present invention relates to an input device, and more particularly to a touch input device.

2. Description of the Prior Art

Many existing electronic equipment, such as a hand-held electronic device and a computer including a cell phone, a personal digital assistant (PDA) and a Global Positioning System (GPS) navigator, will usually require an input device like a keyboard, a mouse or a touch panel, to operate. As the touch panel can be integrated with a screen of the electronic equipment to form a touch screen, the touch panel is used widely.

FIG. 1A shows a top view of a conventional touch panel and FIG. 1B is a cutaway view along the line I-I of FIG. 1A. As shown in the drawings, the conventional touch panel 100 includes a transparent glass plate 110, plural vertical conductive strips 120, plural horizontal conductive strips 130 and a chip 140.

The transparent glass plate 110 is provided with an upper surface 112 and a lower surface 114 which is opposite to the upper surface 112. The vertical conductive strips 120 are all configured on the upper surface 112, and the horizontal conductive strips 130 are all configured on the lower surface 114. In other words, the vertical conductive strips 120 and the horizontal conductive strips 130 are configured respectively on the two opposite surfaces of the transparent glass plate 110.

Accordingly, the vertical conductive strips 120 and the horizontal conductive strips 130 are all transparent indium-tin oxide (ITO) films, and are provided respectively with plural conductive layers 122, 132, wherein the conductive layers 122 in any one vertical conductive strip 120 are electrically connected with one another, and the conductive layers 132 in any one horizontal conductive strip 130 are electrically connected with one another.

The chip 140 is provided with plural input-output contacts 142 which are one-to-one electrically connected to the vertical conductive strips 120 and the horizontal conductive strips 130. Therefore, a total number of the vertical conductive strips 120 and the horizontal conductive strips 130 will be equal to a number of the input-output contacts 142, and the chip 140 is electrically connected to the vertical conductive strips 120 and the horizontal conductive strips 130.

When a touch pen P1 contacts the upper surface 112 or the conductive layers 122, a capacitance value of the vertical conductive strip 120 or the horizontal conductive strip 130 that corresponds to the touch pen P1 will be changed. At this time, the chip 140 will be aware of a position of the touch pen P1 according to the changed capacitance value, so as to move a cursor which is displayed on the screen of the electronic equipment, allowing a user to operate the electronic equipment such as the hand-held electronic device or the computer from the touch panel 100.

Accordingly, each vertical conductive strip 120 and each horizontal conductive strip 130 can serve as a sensor to detect the position of the touch pen P1, respectively. Hence, a number of the sensors that the touch panel 100 is provided with are equal to the total number of the vertical conductive strips 120 and the horizontal conductive strips 130. Taking FIG. 1A as an example, the touch panel 100 includes 5 vertical conductive strips 120 and 4 horizontal conductive strips 130; thus, there are 9 sensors in the touch panel 100.

In general, the more sensors the touch panel 100 has, the higher the accuracy of the touch panel 100 will be provided with; that is, the touch panel 100 can more accurately detect the position of the touch pen P1, so as to accurately control the movement of the cursor. In order to improve the accuracy of the touch panel 100, many companies, factories, enterprises and academic institutes nowadays are developing toward increasing the numbers of the vertical conductive strips 120 and the horizontal conductive strips 130, in the research of the touch panel 100.

SUMMARY OF THE INVENTION

The object of the present invention is to provide a touch input device which can be applied to the aforementioned electronic equipment.

In an embodiment of the present invention, an edge length of a row of the aforementioned device is longer than an edge length of a column of the device.

Through the sensible conductive layers, the touch input device of the present invention can detect a touch pen or a finger, and allow the user to operate the electronic equipment according to the position of the touch pen or the finger. Thus, the touch input device of the present invention can be applied to the electronic equipment.

To enable a further understanding of the objectives and the technological methods of the invention herein, the brief description of the drawings below is followed by the detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE PREFERRED EMBODIMENTS

Figure 2A:
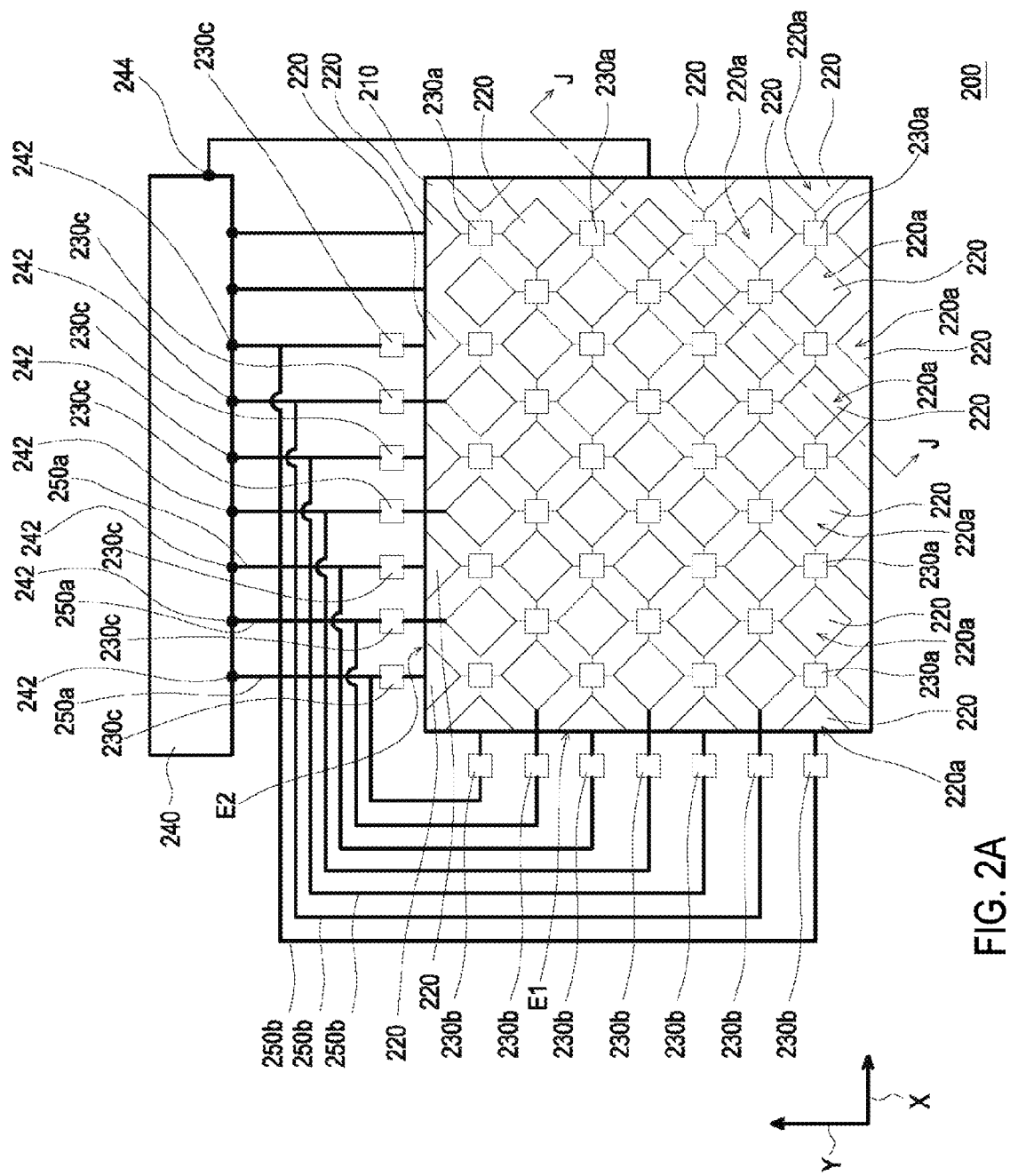
FIG. 2A shows a top view of a touch input device of an embodiment of the present invention.
Figure 2B:
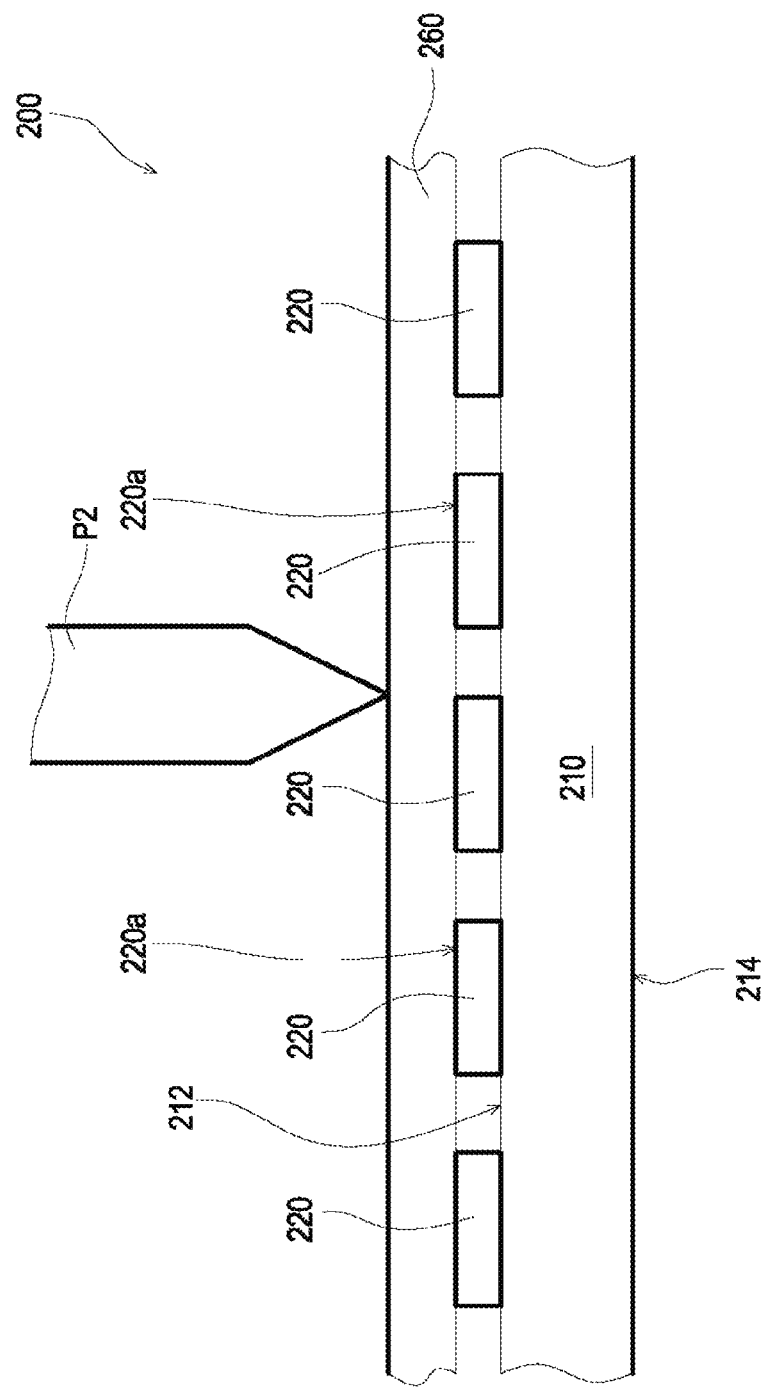
FIG. 2B shows a cutaway view along the line J-J of FIG. 2A.

Referring to FIG. 2A, it shows a top view of a touch input device of an embodiment of the present invention, and FIG. 2B is a cutaway view along the line J-J of FIG. 2A. As shown in the drawings, the touch input device 200 of the present embodiment can be a touch panel and can be integrated with screens of plural kinds of electronic equipment to form touch screens which are further applied to operating the electronic equipment.

The aforementioned electronic equipment can be a hand-held electronic device including a cell phone, a PDA, a GPS navigation device, a digital audio player (DAP) (e.g., an MP3 player) or a portable game console; a computer including a desktop computer, a laptop computer, an industrial computer or a ultra-mobile PC (UMPC); an automatic teller machine; a cash register; or an arcade game machine.

The touch input device 200 comprises a substrate 210, plural sensible conductive layers 220 and plural first switch units 230a. The substrate 210 is provided with an upper surface 212 and a lower surface 214, wherein the upper surface 212 is opposite to the lower surface 214, and the sensible conductive layers 220 are all configured on the upper surface 212. In other words, the sensible conductive layers 220 are all configured on a same surface of the substrate 210.

The substrate 210 can be transparent, that is, the substrate 210 can be a transparent plate which is made by glass, aluminum oxide or a polymer. This polymer, such as polyethylene terephthalate resin (PET), polyimide (PI) or polymethyl methacrylate (PMMA) (the so-called acrylic), can make the transparent plate.

The sensible conductive layers 220 can be plural transparent conducting films which are made by a transparent conducting material, such as indium-tin oxide or indium-zinc oxide. The sensible conductive layers 220 are arranged in columns and rows, wherein the sensible conductive layers 220 can be arranged in an array along directions X and Y; for example, the sensible conductive layers 220 are arranged as rows along the direction X and arranged as columns along the direction Y.

In the present embodiment, the direction X can be perpendicular to the direction Y, and the sensible conductive layers 220 can be arranged as a matrix, as shown in FIG. 2A. On the other hand, top surfaces 220a of some sensible conductive layers 220 are physically in a diamond shape; whereas, for some other sensible conductive layers 220 that are located at edges of the upper surface 212, the top surfaces 220a are physically in a triangular shape.

Nevertheless, it needs to be mentioned that in other embodiments not disclosed, the top surfaces 220a of the sensible conductive layers 220 can be physically in a rectangular shape, a hexagonal shape, a circular shape or an elliptical shape, and the sensible conductive layers 220 can be also arranged as something other than the matrix. For example, the sensible conductive layers 220 can be arranged as a honey comb. Hence, the arrangement method of the sensible conductive layers 220 and the shape of the top surfaces 220a shown in FIG. 2A are used for an example and are not limited to the present invention.

The first switch units 230a are configured on the substrate 210 and are electrically connected to the sensible conductive layers 220. By the first switch units 230a, the sensible conductive layers 220 at a same column can conduct electrically with one another and the sensible conductive layers 220 at a same row can conduct electrically with one another, as well.

For example, each first switch unit 230a is electrically connected between two neighboring sensible conductive layers 220 in a same column of the sensible conductive layers 220, and is electrically connected between two neighboring sensible conductive layers 220 in a same row of the sensible conductive layers 220. In the present embodiment, each first switch unit 230a can be electrically connected between two neighboring sensible conductive layers 220 of each column and of each row of the sensible conductive layers 220.

Accordingly, the first switch units 230a can be provided with a function of circuit switching, allowing the sensible conductive layers 220 in each column to conduct electrically with one another, and the sensible conductive layers 220 in each row to conduct electrically with one another. In other words, the first switch units 230a enable all the sensible conductive layers 220 to conduct electrically with one another along the row direction (e.g., direction X) or the column direction (e.g., direction Y).

When the sensible conductive layers 220 in each column conduct electrically with one another, any two rows of the sensible conductive layers 220 will be electrically insulated from one another. Similarly, when the sensible conductive layers 220 in each row conduct electrically with one another, any two columns of the sensible conductive layers 220 will be electrically insulated from one another, too. Therefore, the first switch units 230a can control the sensible conductive layers 220, such that the sensible conductive layers 220 will not conduct electrically along the rows and the columns at a same time, but conduct electrically along the rows or the columns, optionally.

Furthermore, the first switch units 230a are all configured on the upper surface 212; therefore, the first switch units 230a and the sensible conductive layers 220 are all configured on the same surface of the substrate 210. The first switch units 230a are all located among the sensible conductive layers 220. For example, the first switch units 230a are located between two neighboring sensible conductive layers 220 in a same column of the sensible conductive layers 220, and are located between two neighboring sensible conductive layers 220 in a same row of the sensible conductive layers 220.

The touch input device 200 can further include plural second switch units 230b and plural third switch units 230c, and the second switch units 230b and the third switch units 230c are electrically connected to the sensible conductive layers 220. The upper surface 212 of the substrate 210 is provided with a column edge E1 and a row edge E2, wherein the column edge E1 joins the row edge E2 and is adjacent to the row edge E2. A length of the row edge E2 can be longer than that of the column edge E1. However, in other embodiments (not shown), the length of the row edge E2 can be physically equal to that of the column edge E1.

Accordingly, each second switch unit 230b is electrically connected with one of the sensible conductive layers 220 that are adjacent to the column edge E1, among each row of the sensible conductive layers 220; whereas, each third switch unit 230c is electrically connected with one of the sensible conductive layers 220 that are adjacent to the row edge E2, among each column of the sensible conductive layers 220. Therefore, the second switch units 230b and the third switch units 230c are all electrically connected with the sensible conductive layers 220 that are adjacent to the edges (e.g., the column edge E1 and the row edge E2) of the upper surface 212.

The touch input device 200 can further include a chip 240, plural first connecting wires 250a and plural second connecting wires 250b. The chip 240 is provided with plural input-output contacts 242 from which electric signals can be outputted. The first connecting wires 250a are electrically connected between the third switch units 230c and the input-output contacts 242, respectively; whereas, the second connecting wires 250b are electrically connected between the second switch units 230b and the first connecting wires 250a, respectively.

The second switch units 230b and the third switch units 230c are all capable of turning on or off a circuit, wherein the second switch units 230b can turn on or off the circuits between the second connecting wires 250b and the sensible conductive layers 220, and the third switch units 230c can turn on or off the circuits between the first connecting wires 250a and the sensible conductive layers 220. Therefore, the second switch units 230b and the third switch units 230c can all turn on or off the circuits between the chip 240 and the sensible conductive layers 220.

On the other hand, the second switch units 230b and the third switch units 230c will turn on or off the circuits alternately. To disclose in detail, when the second switch units 230b are turned on, the third switch units 230c are turned off. On the contrary, when the third switch units 230c are turned on, the second switch units 230b will be turned off. Therefore, the chip 240 will alternately output the electric signals from the second switch units 230b and the third switch units 230c to the sensible conductive layers 220, thereby driving the sensible conductive layers 220.

In the present embodiment, the touch input device 200 can further include a protection layer 260 which is configured on the upper surface 212 and covers the sensible conductive layers 220. For example, the protection layer 260 fully covers the upper surface 212, all the sensible conductive layers 220 and all the first switch units 230a. Thus, the protection layer 260 can protect the sensible conductive layers 220 and the first switch units 230a from being scratched.

The protection layer 260 can be transparent and can be an insulator. For example, the protection layer 260 can be made by glass or polymethyl methacrylate (or acrylic). Hence, the touch input device 200 can be properly applied in a technology field of the touch screen and the protection layer 260 can prevent the sensible conductive layers 220 from being short-circuited.

The touch input device 200 can be operated through a touch pen P2 (as shown in FIG. 2B) or a finger, wherein the touch pen P2 can be a capacitor pen. When the touch pen P2 or the finger contacts the protection layer 260, a capacitance value of the sensible conductive layer 220 corresponding to the touch pen P2 or the finger will be changed, and the chip 240 will control electronic equipment according to the changed capacitance value. For example, the chip 240 enables a cursor which is displayed on a screen of electronic equipment to move. Therefore, a user can use the touch input device 200 to operate a computer, a hand-held electronic device, an automatic teller machine, a cash register or an arcade game machine.

It is to be noted that although the touch input device 200 shown in FIG. 2B includes the protection layer 260, in other embodiments, it is also acceptable that the touch input device 200 does not include the protection layer 260, allowing the touch pen P2 or the finger to directly touch the sensible conductive layers 220. When the sensible conductive layers 220 are touched by the touch pen P2 or the finger, the capacitance value of the sensible conductive layer 220 corresponding to the touch pen P2 or the finger will be changed, as well. Thus, even without the protection layer 260, the touch input device 200 can still operate the electronic equipment.

Accordingly, the chip 240, in association with the first switch units 230a, enables each column and each row of the sensible conductive layers 220 to receive the electric signals alternately, to detect the touch pen P2 or the finger. Therefore, each row and each column of the sensible conductive layers 220 can serve as sensors to detect a position of the touch pen P2 or the finger, respectively. In other words, the number of sensors that the touch input device 200 has is equal to a sum of the number of columns and the number of rows of all the sensible conductive layers 220.

For instance, the touch input device 200 shown in FIG. 2A includes 9 columns of sensible conductive layers 220 and 7 rows of sensible conductive layers 220. Therefore, there are 16 sensors in the touch input device 200. In comparison to the prior art, although for the conventional touch panel 100 shown in FIG. 1A, the total number of conductive layers 122, 132 is equal to the number of sensible conductive layers 220 in the touch input device 200, the touch input device 200 has 7 more sensors than the touch panel 100, thereby being provided with higher accuracy.

On the other hand, the number of input-output contacts 242 that the chip 240 has is equal to the largest value of the number of columns of sensible conductive layers 220 and the number of rows of sensible conductive layers 220. In other words, if the number of columns of sensible conductive layers 220 is larger than the number of rows of sensible conductive layers 220, then the number of input-output contacts 242 is the number of columns. On the contrary, if the number of columns of sensible conductive layers 220 is less than the number of rows of sensible conductive layers 220, then the number of input-output contacts 242 will be the number of rows.

Taking FIG. 2A as an example, the touch input device 200 shown in FIG. 2A includes 9 columns of sensible conductive layers 220 and 7 rows of sensible conductive layers 220. Therefore, the number of columns of sensible conductive layers 220 is larger than the number of rows of sensible conductive layers 220, and the chip 240 is provided with 9 input-output contacts 242. Accordingly, the number of input-output contacts 242 that the chip 240 is provided with is equal to the number of columns of sensible conductive layers 220.

Figure 1A:
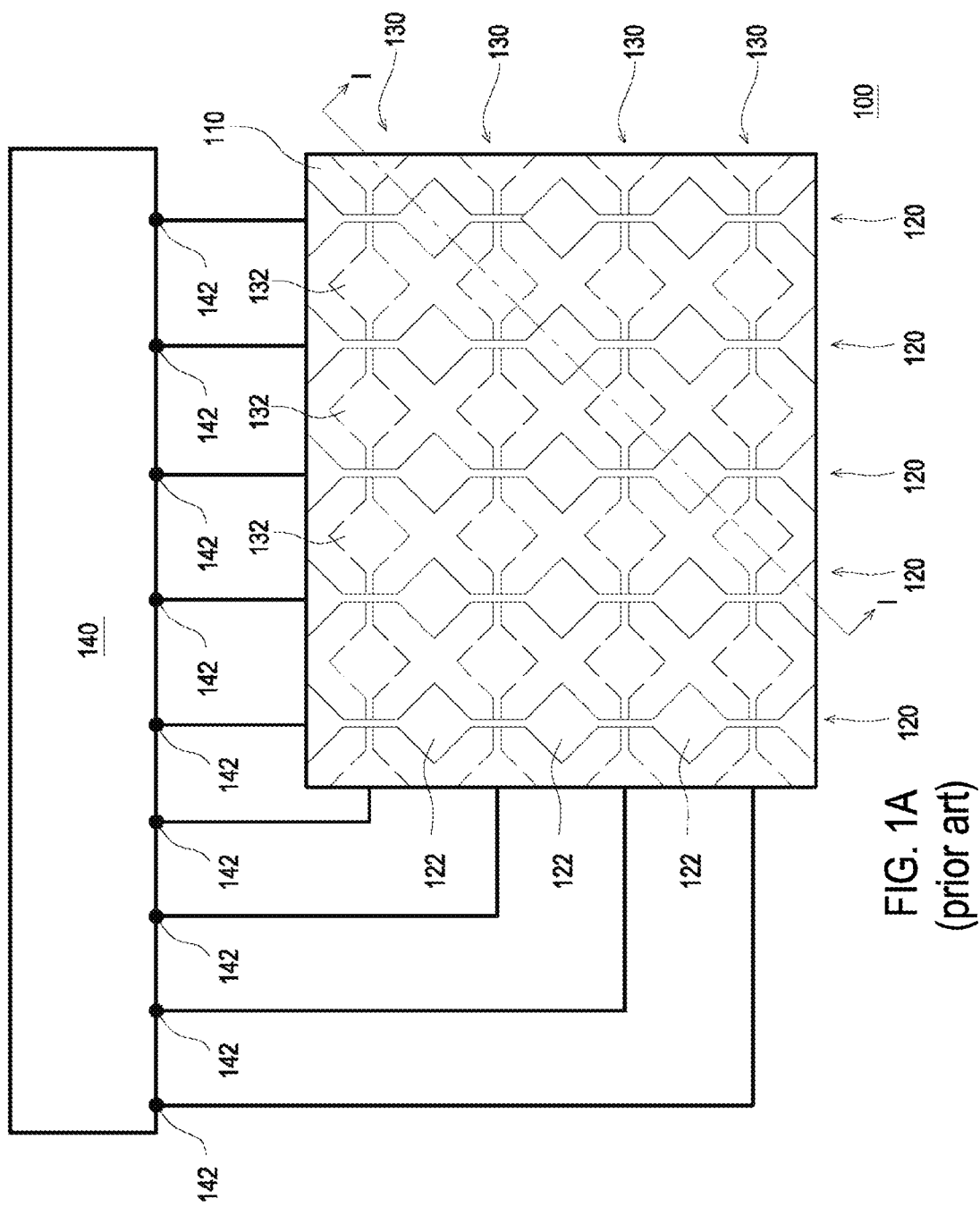
FIG. 1A shows a top view of a conventional touch panel.
Figure 1B:
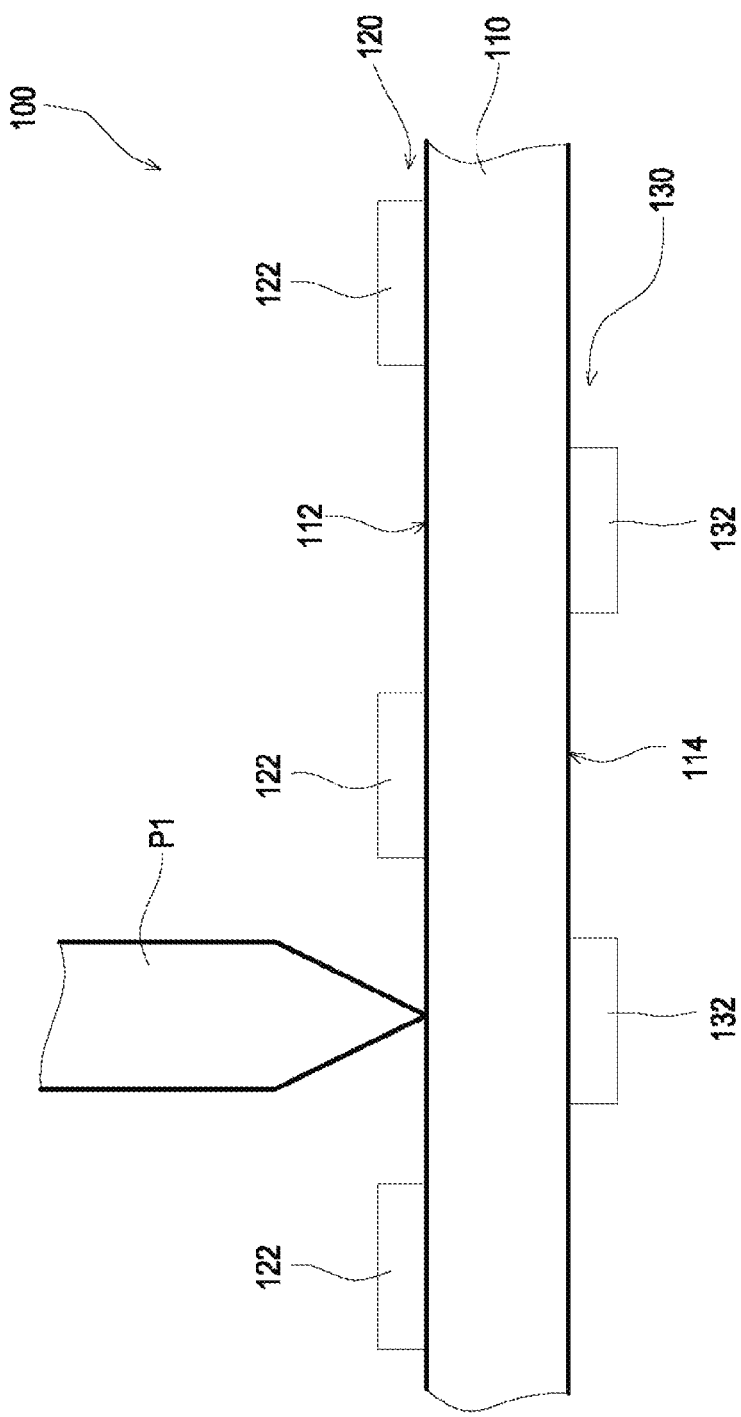
FIG. 1B shows a cutaway view along the line I-I of FIG. 1A.

Besides, in comparison with the conventional touch panel 100 shown in FIG. 1A, although the total number of conductive layers 122, 132 that the touch panel 100 includes is equal to the number of sensible conductive layers 220 that the touch input device 200 has, the number of input-output contacts 242 that the chip 240 has, in the present embodiment, is equal to the number of input-output contacts 142 that the chip 140 in the prior art has.

Accordingly, under the condition that the number of sensible conductive layers 220 is equal to the total number of conductive layers 122, 132 in the prior art, and the number of input-output contacts 242 is equal to the number of input-output contacts 142 in the prior art, the touch input device 200 of the present embodiment can be provided with more sensors to acquire higher accuracy, thereby accurately detecting the position of the touch pen P2 or the finger.

Regarding to a circuit structure of the first switch units 230a, there are plural embodiments for the first switch units 230a. One of the circuit structures, among the plural embodiments, of the first switch units 230a is disclosed hereinafter, in association with FIG. 2A and FIG. 2C. Hence, the circuit structure of the first switch units 230a disclosed in FIG. 2C is only for example, and is not limited to the present invention.

Figure 2C:
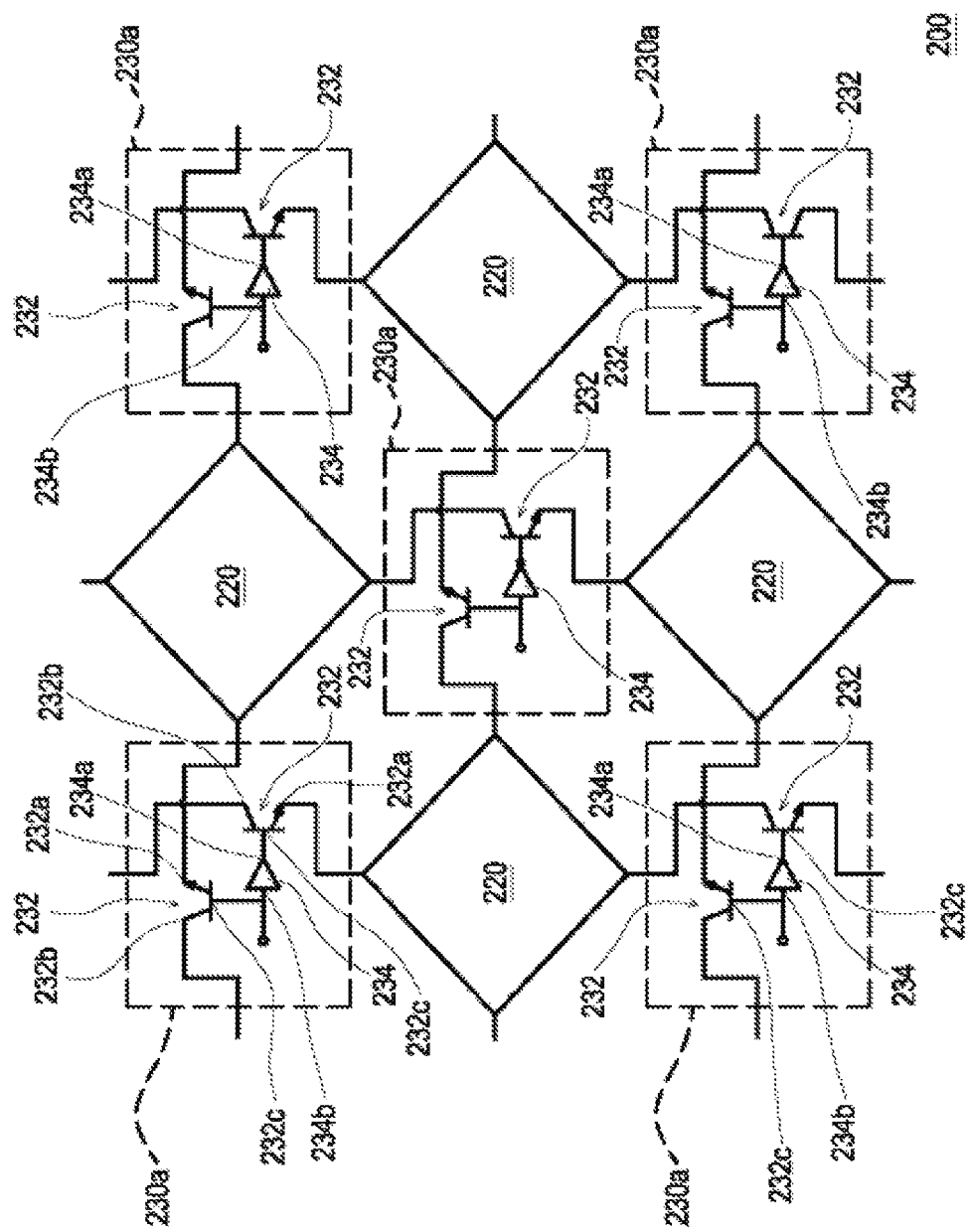
FIG. 2C is a circuit diagram of the touch input device in FIG. 2A

FIG. 2C is a circuit diagram of the touch input device in FIG. 2A. Referring to FIG. 2A and FIG. 2C, each first switch unit 230a includes two transistors 232 and an inverter 234 which is electrically connected with the transistors 232, wherein one transistor 232 is electrically connected between two neighboring sensible conductive layers 220 in a same column of the sensible conductive layers 220, and the other transistor 232 is electrically connected between two neighboring sensible conductive layers 220 is a same row of the sensible conductive layers 220.

Each transistor 232 is provided with a first output end 232a, a first input end 232b and an activation end 232c, and at least one transistor 232 can be a field-effect transistor, a bipolar transistor or a thin-film transistor. For instance, in a same first switch unit 230a, both transistors 232 can be the field-effect transistors or the bipolar transistors. On the other hand, one transistor 232 can be the field-effect transistor and the other transistor 232 is the bipolar transistor.

When the transistor 232 is the field-effect transistor, the activation end 232c is a gate, the first input end 232b is a source and the first output end 232a is a drain. However, when the transistor 232 is the bipolar transistor, the activation end 232c is a base, the first input end 232b is a collector and the first output end 232a is an emitter.

The inverter 234 is provided with a second output end 234a and a second input end 234b, wherein the second input end 234b is electrically connected with the activation end 232c of one transistor 232, and the second output end 234a is electrically connected with the activation end 232c of the other transistor 232. Therefore, in the same first switch unit 230a, the inverter 234 can turn on or off the transistors 232.

The first switch units 230a can use clock signals to switch the circuits. To disclose in detail, the chip 240 can be further provided with a clock generation end 244 which is electrically connected to the second input end 234b of the inverter 234. Therefore, the chip 240 can output a clock signal from the clock generation end 244 to the inverter 234.

The clock signal includes plural pulses and the inverter 234 can inverse the clock signals. When the inverter 234 receives the clock signals, the two transistors 232 in a same first switch unit 230a will be turned on alternately. In other words, when one transistor 232 is turned on, the other transistor 232 is turned off; that is, the two transistors 232 will not be turned on at a same time. Therefore, the first switch unit 230a is able to switch the circuits.

On the other hand, the circuit structures of the second switch unit 230b and the third switch unit 230c can be the same as the circuit structure of the first switch unit 230a shown in FIG. 2C. However, in other embodiments, each second switch unit 230b can include one transistor 232 and each third switch unit 230c can also include one transistor 232.

It is to be noted that as the transistor 232 can be the thin-film transistor, and the inverter 234 is basically composed of plural transistors (such as the thin-film transistors), the inverter 234 and the transistor 243 can be manufactured by a person who is provided with common knowledge in a technology field of the present invention, according to the aforementioned contents and a manufacturing technology of an existing thin-film transistor liquid crystal display.

Figure 3A:
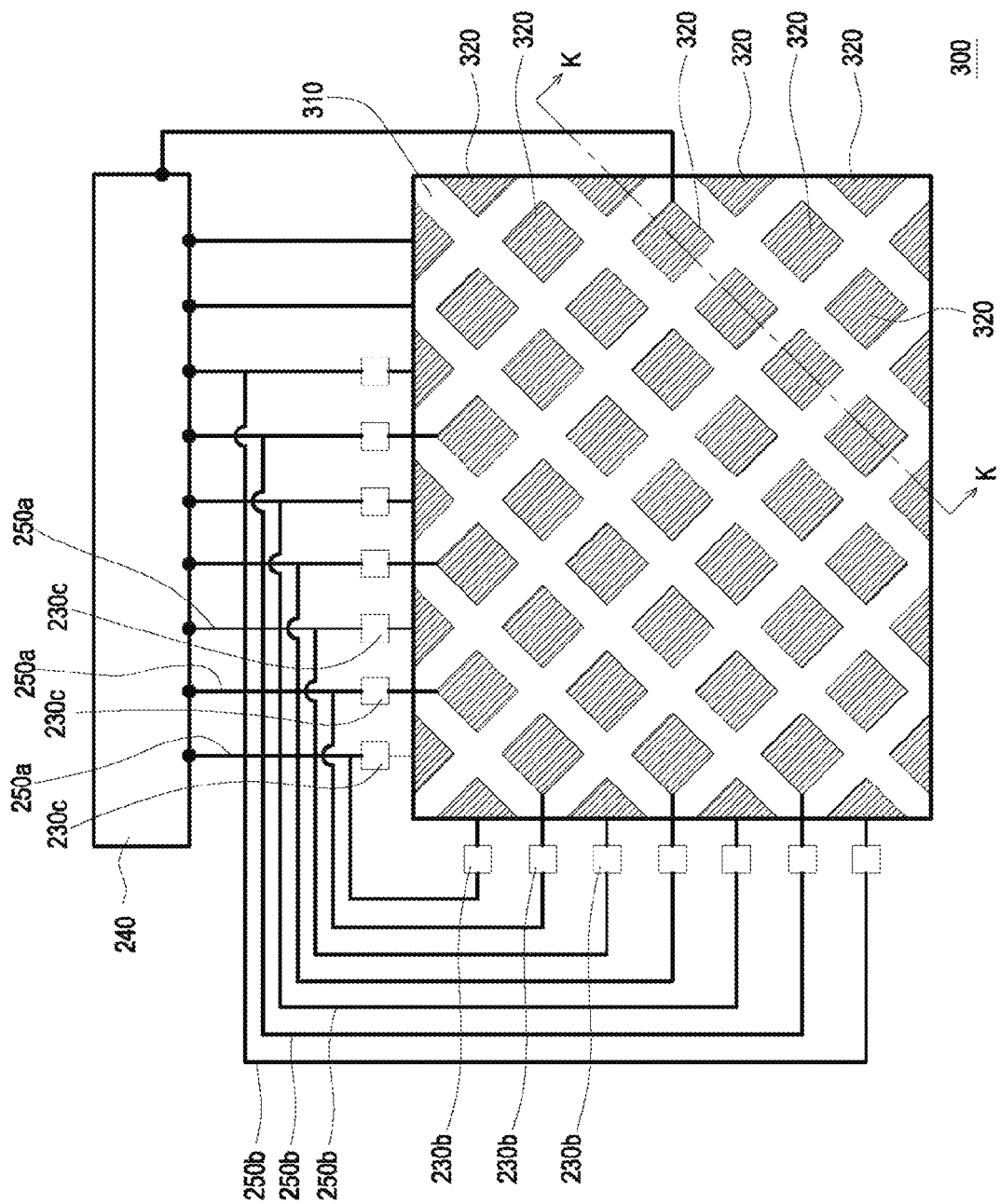
FIG. 3A shows a top view of a touch input device of another embodiment of the present invention.
Figure 3B:
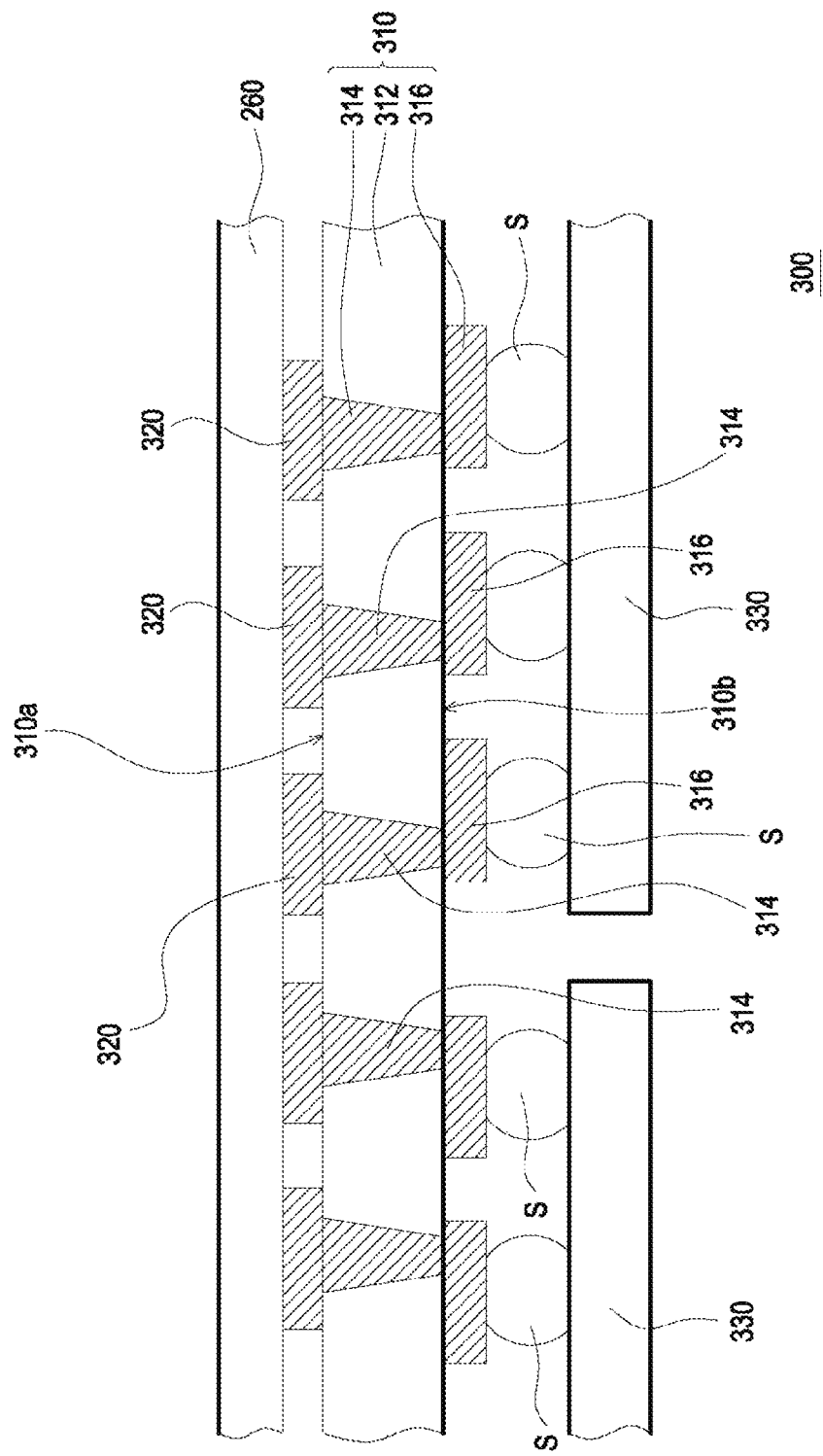
FIG. 3B shows a cutaway view along the line K-K of FIG. 3A.

FIG. 3A is a top view of a touch input device of another embodiment of the present invention and FIG. 3B is a cut-away view along the line K-K of FIG. 3A. As shown in the drawings, a touch input device 300 of this embodiment is similar to the touch input device 200 in the previous embodiment. Therefore, the differences between the two devices are focused hereinafter.

The touch input device 300 includes a substrate 310, plural sensible conductive layers 320 and plural first switch units (not shown). The substrate 310 is provided with an upper surface 310a and a lower surface 310b which is opposite to the upper surface 310a, wherein the sensible conductive layers 320 are all configured on the upper surface 310a, meaning that the sensible conductive layers 320 are all configured on the same surface of the substrate 310.

The substrate 310 and the sensible conductive layers 320 can be integrated into a circuit board which can be a printed wiring board (PWB) or a flexible wiring board. Accordingly, the substrate 310 of the present embodiment is not necessarily transparent and the touch input device 300 can be made into a touch pad of a laptop computer or an electronic sketch pad.

To disclose in detail, the substrate 310 can include a dielectric layer 312, plural conductive connecting structures 314 and plural pads 316. The dielectric layer 312 is made by resin or a ceramic material and the sensible conductive layers 320 can be formed through electro-plating or by lithographing and etching to a piece of metallic foil, such as a copper foil.

Accordingly, the pads 316 and the sensible conductive layers 320 are located respectively on two opposite surfaces of the dielectric layer 312; whereas, the conductive connecting structures 314 are located inside the dielectric layer 312 and are connected respectively between the pads 316 and the sensible conductive layers 320. By the conductive connecting structures 314, the pads 316 and the sensible conductive layers 320 can conduct electrically.

The first switch units in the touch input device 300 can be integrated into one or plural chips 330 and the chips 330 are all configured on the lower surface 310b. In other words, the first switch units are configured on the lower surface 310b; that is, the sensible conductive layers 320 and the first switch units are configured respectively on two opposite surfaces of the substrate 310. Besides, the circuit structure of each first switch unit can be the same as that of the first switch unit 230a in the previous embodiment.

The chips 330 are electrically connected with the sensible conductive layers 320, allowing the first switch units to be electrically connected with the sensible conductive layers 320. To disclose in detail, the chips 330 are assembled on the substrate 310 and are electrically connected to the pads 316, wherein the chips 330 can be assembled on the substrate 310 by a flip-chip technology or a wire-bonding technology. In terms of the flip-chip technology, the chips 330 can be electrically connected with the pads 316 through plural solder balls S.

As the conductive connecting structures 314 are connected respectively between the pads 316 and the sensible conductive layers 320, and the chips 330 are electrically connected with the pads 316, the chips 330 will be electrically connected to the sensible conductive layers 320 through the solder balls S, the pads 316 and the conductive connecting structures 314. Hence, the first switch units can be electrically connected with the sensible conductive layers 320.

It is to be noted that the touch input device 300 can also include other elements disclosed in the previous embodiment. For instance, the touch input device 300 can be further provided with the chips 240, the plural second switch units 230b, the plural third switch units 230c, the plural first connecting wires 250a, the plural second connecting wires 250b and the protection layer 260. The functions, the circuit structures and interrelationships of connection and configuration of the aforementioned elements are the same as those in the previous embodiment, which will not be described further.

Nevertheless, in other embodiments, the second switch units 230b and the third switch units 230c can be integrated into the chip 330 or can be integrated into another chip. On the other hand, the chip 240 can be also assembled on the substrate 310 by the flip-flop technology or the wire-bonding technology; whereas, the first connecting wires 250a and the second connecting wires 250b can be also configured on the dielectric layer 312 to form a trace on the circuit board.

Accordingly, by using the plural first switch units, the present invention is capable of largely increasing the number of sensors that the touch input device is provided with. Therefore, the present invention can effectively improve the accuracy of the touch input device, to accurately detect the position of the touch pen or the finger, thereby allowing the user to operate the electronic equipment smoothly.

On the other hand, under the condition that the number of input-output contacts of the present invention is the same as or close to that of the prior art, the touch input device of the present invention can have more sensors. Accordingly, by the present invention, the accuracy of the touch input device can be improved, and the number of input-output contacts can be maintained, at a same time.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A touch input device, comprising:
a substrate which is provided with an upper surface;
a plurality of sensible conductive layers, all of which are configured on the upper surface of the substrate and are arranged in columns and rows; and
a plurality of first switch units, which are configured on the substrate and are electrically connected with the sensible conductive layers, such that one of a step A and a step B is completed by the first switch units, and the other one of the step A and the step B is not completed by the first switch units, wherein the step A is that the sensible conductive layers of same columns conduct electrically with one another, and the step B is that the sensible conductive layers of same rows conduct electrically with one another;
wherein each first switch unit includes:
two transistors, one of which is connected between two neighboring sensible conductive layers of a same column of the sensible conductive layers, and the other one of which is electrically connected between two neighboring sensible conductive layers of a same row of the sensible conductive layers, with each transistor being provided with an activation end, a first output end and a first input end; and
an inverter, which is provided with an output end and an input end, wherein the input end of the inverter is electrically connected with the activation end of one transistor and the output end of the inverter is electrically connected with the activation end of the other transistor.

2. The touch input device according to claim 1, wherein at least one transistor is a bipolar transistor.

3. The touch input device according to claim 1, further comprising a plurality of second switch units, and the upper surface of the substrate is provided with a column edge, with each second switch unit being electrically connected with one of the sensible conductive layers that are adjacent to the column edge, among each row of the sensible conductive layers.

4. The touch input device according to claim 3, further comprising a plurality of third switch units, and the upper surface of the substrate is further provided with a row edge connected to the column edge, with each third switch unit being electrically connected with one of the sensible conductive layers that are adjacent to the row edge, among each column of the sensible conductive layers.

5. The touch input device according to claim 4, further comprising:
a chip having a plurality of input-output contacts;
a plurality of first connecting wires, being electrically connected between the third switch units and the input-output contacts, respectively; and
a plurality of second connecting wires, being electrically connected between the second switch units and the first connecting wires, respectively.

6. The touch input device according to claim 5, wherein the chip is further provided with a clock generation end which is electrically connected with the input end of the inverter, and the chip outputs a clock signal from the clock generation end to the inverter.

7. The touch input device according to claim 1, further includes a protection layer configured on the upper surface of the substrate to cover the sensible conductive layers.

8. The touch input device according to claim 7, wherein the protection layer is transparent.

9. The touch input device according to claim 1, wherein each first switch unit is electrically connected between two neighboring sensible conductive layers in a same column of the sensible conductive layers, and is electrically connected between two neighboring sensible conductive layers in a same row of the sensible conductive layers.

10. The touch input device according to claim 9, wherein the first switch units are all configured on the upper surface of the substrate, are located between two neighboring sensible conductive layers in same columns of the sensible conductive layers, and are located between two neighboring sensible conductive layers in same rows of the sensible conductive layers.

11. The touch input device according to claim 10, wherein the sensible conductive layer is a transparent conducting film.

12. The touch input device according to claim 11, wherein the transparent conducting film is made by indium-tin oxide or indium-zinc oxide.

13. The touch input device according to claim 10, wherein the substrate is a transparent plate.

14. The touch input device according to claim 13, wherein the transparent plate is made by glass, aluminum oxide or a polymer.

15. The touch input device according to claim 9, wherein the substrate is further provided with a lower surface which is opposite to the upper surface, and the first switch units are all configured on the lower surface.

16. The touch input device according to claim 15, wherein the first switch units are integrated into at least one chip.

17. The touch input device according to claim 15, wherein the substrate and the sensible conductive layers are integrated into a circuit board.

* * * * *